(12) United States Patent
Meskauskas et al.

(10) Patent No.: US 7,203,180 B2
(45) Date of Patent: Apr. 10, 2007

(54) INITIATING SERVICE LOGIC

(75) Inventors: Paulius Meskauskas, Espoo (FI); Ossi Tervonen, Tampere (FI); Jukka Ahonen, Tampere (FI)

(73) Assignee: Nokia Corporation, Espoo (FI)

( * ) Notice: Subject to any disclaimer, the term of this patent is extended or adjusted under 35 U.S.C. 154(b) by 1064 days.

(21) Appl. No.: 10/291,709

(22) Filed: Nov. 12, 2002

(65) Prior Publication Data

US 2003/0107995 A1 Jun. 12, 2003

Related U.S. Application Data

(63) Continuation of application No. PCT/FI01/00451, filed on May 10, 2001.

(30) Foreign Application Priority Data

May 12, 2000 (FI) .................................. 20001140

(51) Int. Cl.
*H04Q 7/00* (2006.01)
*H04L 12/403* (2006.01)
(52) U.S. Cl. ...................................... 370/328; 370/522
(58) Field of Classification Search ................. 370/328
See application file for complete search history.

(56) References Cited

U.S. PATENT DOCUMENTS

| 6,111,854 | A * | 8/2000 | Mukaino | 370/229 |
| 6,259,776 | B1 * | 7/2001 | Hunt | 379/114.01 |
| 6,510,214 | B1 * | 1/2003 | McDaniel | 379/134 |
| 6,532,214 | B1 * | 3/2003 | Rumsewicz | 370/236 |

FOREIGN PATENT DOCUMENTS

| WO | WO 97/09814 | 3/1997 |
| WO | WO 98/57504 | 12/1998 |

OTHER PUBLICATIONS

A Strategy for the Resolution of Intelligent Network (IN) Signalling System No. 7 (SS7) Congestion Control Conflicts, Jennings et al, Communications, 1998 ICC 98. Conference re IEEE International Conference, pp. 1601-1606 vol. 3 Jun. 7-11, 1998.
Investigation of Overload Control Algorithms for SCPs in the Intelligent Network, Kihl et al, Communications, IEE Proceedings on pp. 419-423, Dec. 1997.
On Overload Control of Intelligent Peripherals in Intelligent Networks, Kihl et al, Global Telecommunications Conference, 1996, '96. Communications: The Key to Global Prosperity Nov. 18-22, 1996.
Thin Clients and Distributed Servers for Service Management; Lenander et al, Intelligent Network Workshop, 1998. IN '98. P 7th IEEE on pp. 303-313, May 10-13, 1998.

* cited by examiner

*Primary Examiner*—Chau Nguyen
*Assistant Examiner*—Leibo Ding
(74) *Attorney, Agent, or Firm*—Squire, Sanders & Dempsey, LLP.

(57) ABSTRACT

A method, telecommunication system, and a service control point is provided for monitoring the load situation of the service control point during the initiation of a service logic controlling the connection, particularly when the control point cannot restrict the service requests. The load situation may be monitored by maintaining a first data item in the control point, which indicates if the control point is overloaded. When an operation requesting the initiation of a service logic is received, a check is made to determine if the control point is overloaded. The service logic is initiated if the control point is not overloaded.

13 Claims, 1 Drawing Sheet

INITIATING SERVICE LOGIC

This application is a Continuation of International Application PCT/FI01/00451 filed May 10, 2001 which designated the U.S. and was published under PCT Article 21(2) in English.

FIELD OF THE INVENTION

The invention relates to considering the load situation of a network node controlling a connection during initiation of a service logic required for controlling the connection.

BACKGROUND OF THE INVENTION

An intelligent network (IN) is a network architecture to be linked to a basic network (a fixed network or a mobile communication network, for example) and in which the control of services has been transferred from the telephone exchange to a separate intelligent network functional unit, hereinafter called a service control point (SCP). This makes the services independent of the operation of the basic network, and the structure and software of the basic network do not have to be changed when services are modified or added. Network nodes attending to an intelligent network interface are called service switching points (SSP). Typically, an SSP is a network node responsible for connection set-up, the exchange of the basic network, for example. Hereinafter the services produced by an intelligent network will be called intelligent services.

When a call to which an intelligent service is related is set up, the service switching point SSP attends to the set-up arrangements. In response to the fulfilment of a given authentication condition (i.e., a given call-related event), the service switching point triggers the intelligent service by sending a service request to the control point. At the same time, the SSP interrupts the processing of the call and waits for an instruction/instructions from the SCP. When an intelligent service is triggered, a service logic program SLP is initiated in the service control point SCP and the operation of the program determines the instructions the SCP will send to the SSP at different stages of a call.

Since one service control point SCP can receive service requests from several switching points, and several requests from one switching point, the service switching point that sent the request cannot know how loaded the control point is. Protocols based on the INAP (Intelligent Network Application Protocol), such as CoreINAP and fixed INAP used in fixed networks and mobileINAP used in mobile communication networks, comprise a non-call-associated operation by which the control point can restrict the number of intelligent network service requests sent by the switching point. The control point sends this operation to the switching point when overloading is detected in the control point irrespective of whether the switching point is sending a service request to the control point or not.

Protocols, which take into account the special requirements of a mobile communication system, have been developed for mobile communication networks. An example of such a protocol is the CAP protocol (CAMEL Application Protocol) used by the pan-European GSM system (Global System for Mobile communications) in intelligent services. CAMEL (Customized Applications for Mobile network Enhanced Logic) is one of the GSM phase 2+ services. The CAMEL phase 1 and phase 2 standards do not describe how to operate when a control point is overloaded. The CAMEL phase 1 and 2 CAP protocols do not even define an operation by which the control point could restrict the number of intelligent service requests.

BRIEF DESCRIPTION OF THE INVENTION

It is an object of the invention to provide a method and an apparatus for implementing the method for transmitting information to a switching point about the overload of a control point, using standard signalling, when the switching point wants to trigger an intelligent service.

The objects of the invention are achieved by a method of considering the load situation of a control point in an intelligent network during initiation of a service logic controlling a connection, which is characterized by maintaining in the control point a first data item which indicates if the control point is overloaded; receiving an operation requesting the initiation of the service logic; checking if the control point is overloaded; and if so, not initiating the service logic; and if not, initiating the service logic.

The invention also relates to a telecommunication system comprising at least one control point which gives instructions related to the processing of a connection and which is arranged to initiate the service logic of the desired service in response to a service request related to the connection; and at least one switching point comprising a switching function for processing the connection, the switching function being arranged to identify the need for service and to send a service request related to the connection to the control point. The telecommunication system is characterized in that the control point is arranged to maintain information on whether the control point is overloaded; and in response to receiving the service request, to check if the control point is overloaded and to initiate the service logic only if the control point is not overloaded.

The invention further relates to a service control point arranged to be in a functional connection with a connection switching point, to give instructions related to the processing of the connection to the connection switching point and, in response to a service request related to the connection, to initiate the service logic of the requested service. The service control point is characterized in that it is arranged to maintain information on whether the control point is overloaded; and in response to the reception of a service request, to check if the control point is overloaded and to initiate the service logic only if the control point is not overloaded.

The invention is based on maintaining information in the control point about whether the control point is overloaded. This information is always checked when a service initiation request has been received at the control point. If the control point is overloaded, the service logic is not initiated, but a release connection command is preferably sent to the switching point. It is an advantage of the invention that no unnecessary attempts are made to initiate the service logic when the control point is overloaded. On the other hand, information on an overload is not sent unnecessarily in advance to the switching point in situations when an intelligent service will not be triggered in the switching point during an overload situation. A further advantage of the invention is that an overload situation can be cleared by an operation according to the standards of the protocol used.

In a preferred embodiment of the invention, the release connection command includes overloading as the reason for the release. A further advantage of this embodiment is that this way the operator can find out, when required, that the reason for the release was not malfunction or some other problem, but overloading of the control point.

In a preferred embodiment of the invention, the overload situation is checked in lower protocol layers. A further advantage of this embodiment is that this way the number of program instances and/or the amount of the capacity of the central processing unit that are engaged to process the received service request can be kept at a minimum.

The preferred embodiments of the method, system and network node of the invention are disclosed in the appended dependent claims.

BRIEF DESCRIPTION OF THE FIGURES

The invention will be described in greater detail below in connection with preferred embodiments with reference to the attached drawings, in which.

DETAILED DESCRIPTION OF THE INVENTION

Figure 1:
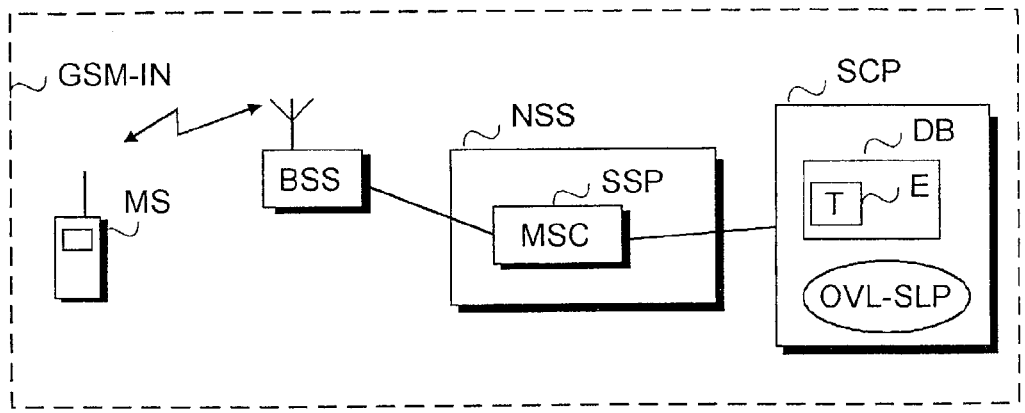
FIG. 1 is a block diagram of the essential elements of the system according to a first preferred embodiment of the invention.

In the following the invention and its background will be described by using the terminology of ETSI (European Telecommunications Standards Institute) CAMEL phase 2 standard TS 101 046 v.6.4.0 on CAMEL Application Part (CAP) Specification and the present structure of an intelligent network, adapted to the GSM, without, however, restricting the invention to such a solution. The invention can also be employed in intelligent networks implemented according to other intelligent network standards (such as ANSI, AIN, WIN, CoreINAP or mobileINAP) or in intelligent network-like execution platforms that use some other intelligent network protocol for data transmission. Intelligent network-like execution platforms are execution platforms using the control principles of an intelligent network. In the present application, the control principles of an intelligent network refer to a contact made to the control function on the basis of trigger information. In principle, these execution platforms differ from an intelligent network only in that for example between the SCP and the SSP no IN protocol is used, but instead the IP protocol, for example, is employed. In addition, they may differ as regards the impulse leading to triggering: triggering occurs in an intelligent network when a given call phase is encountered, whereas in other protocols some other external or internal impulse may achieve the triggering.

In the present application, an intelligent network refers generally to a solution in which a node, or SSP, processing a call, a session or packet data, contacts the service control function which provides node instructions for transferring the call, the session or the packet data. The node contacts the service control function on the basis of service triggering data possessed by the node. Triggering data may be added and/or deleted at the request of an external service in the middle of connection set-up or even before connection set-up has begun. Characteristic of an intelligent network are triggers, state models and a controlling protocol or an API (Application Protocol Interface) interface between the control function and the network switching node. A call, a session or packet data transmission may be described by a state model which is visible to the control function and which is composed of phases and detection points related thereto, in which processing can be interrupted to wait for instructions from the control function. Not only detection points, but also triggering data can be defined in the state model for session or call related events independent of the detection points. A controllable entity can also operate for instance only by means of external impulses from which triggers occur, and in this case no state model is necessarily required. Controls and operations may also be methods to be directed to call entities and related event notifications. In the present application, the term call refers, not only to a conventional call, but also to other, possibly virtual, connection states having associated user data transmission, such as data sessions or packet data transmission. Examples are a packet radio session (such as a GPRS session), a VoIP session (Voice IP) and a multimedia session according to H.323 or SIP (IETF session initiation protocol).

In addition to means required to implement the control to be required by the triggering according to prior art, the telecommunication system implementing the functionality of the present invention also comprises means for maintaining information indicating and checking the loading situation of the control function before initiation of the controlling service logic. Current network nodes comprise processors and memory, which can be utilized in the functions of the invention. All changes required for implementing the invention can be carried out as added or updated software routines and/or with application circuits (ASIC).

FIG. 1 very schematically shows the network architecture GSM-IN of the GSM system and an intelligent network IN connected thereto, as the network structure is not substantially significant to the invention. The example of FIG. 1 only shows the network nodes of the intelligent network relevant to the invention and the basic structure of the GSM system. FIG. 1 does not show the actual facilities of an intelligent network. They will be described in connection with the network node comprising the facility.

The structure of a GSM network according to the GSM system 1 consists of two parts: a base station subsystem (BSS) and a network subsystem (NSS). The BSS and mobile stations MS communicate by means of radio connections. The base station subsystem is linked to the mobile services switching centre MSC of the network subsystem NSS. The mobile services switching centre switches calls in which at least one the parties is a mobile station MS. Some mobile services switching centres are linked to other telecommunication networks, such as the public switched telephone network PSTN, and they contain switching functions for switching calls to and from these networks. These mobile telephone centres are called gateway centres (not shown in FIG. 1).

The network subsystem NSS comprises two kinds of databases, which are not shown in FIG. 1. Subscriber data on each subscriber of the network is stored permanently or semi-permanently in a home location register HLR in such a manner that the subscriber data is connected to the subscriber identifier IMSI. The subscriber data includes routing information, i.e., the current location of the subscriber, and information on the services the subscriber can access. Another type of register is a visitor location register VLR. When a mobile station MS is active (it has registered in the network and can initiate or receive a call), most of the subscriber data on the mobile station MS included in the home location register HLR is loaded (copied) to the visitor location register of the mobile telephone centre within whose area the mobile station MS is located.

An intelligent network is linked to the telecommunications system GSM-IN in such a manner that the intelligent network service switching point SSP is also a centre or corresponding network node in the telecommunication system, as is the mobile services switching centre MSC in the example of FIG. 1. An intelligent network service switching point SSP contains a service switching function SSF and a call control function CCF. The call control function CCF is not a function related to the intelligent network, but a standard function in centres and comprises high-level call processing functions of the centre, such as set-up and release of transmission links. The service switching function SSF is the interface between the call control function CCF and the service control function SCF. The SSF interprets the requests sent by the SCF and relays them to the CCF which initiates the call control functions required by them. Similarly, the call control function CCF uses the SSF to request for instructions from the SCF. The SSF is fixedly coupled to the CCF and acts as its interface. Accordingly, each SSF is in the same centre as the CCF. In the present application, the service switching point SSP is equal in value to the functional entity formed by the CCF and the SSF. The service switching point SSP may contain a call control agent function (CCAF), granting users access to the network. The service switching point SSP is typically a centre which implements the service switching function, i.e., service identification and initiation of co-operation, but the SSP may also be another type of network node or a call processing server, such as the node responsible for the VoIP connection set-up, an H.323 Gatekeeper or an SIP (Session Initiation Protocol) Proxy, for example. Consequently, the SSP is only an example of an entity triggering the service logic of intelligent service. In solutions based on CAMEL, the SSF is also called gsmSSF.

A network node containing the service control function SCF is called a service control point SCP. In solutions based on CAMEL, the SCF is called gsmSCF. In the present application, the service control function also refers to different application servers. The control function may also be in the same network node as the switching function, whereby intra-node control is involved. The service control function contains all service logic and service-related control. Consequently, the control function contains for example the required database DB, including for example service data, and service logic programs (SLP), i.e., computer software for implementing the logical structure of a given service, i.e., the service logic. The service control function may be merely a logical function that can be seen as uniform from the point of view of the service switching point SSP. Its internal implementation may differ, it may be internally decentralized, and the service logic related thereto may be decentralized in different nodes. The service information may also be decentralized in different network nodes than is the service logic. For example, the service control function or point (SCF/SCP) may be internally decentralized and only offer an open interface (for example CORBA, Common Object Request Broker Architecture) for an external server offered by an external service provider. In this case, the SCP and the external server together form the service control function. In the present application, the service control function SCF and the service control point SCP are equal in value and will hereinafter be called control point SCP.

If the control point supports an INAP protocol, the control point contains the service logic OVL-SLP monitoring overload situations. It is utilized in a first preferred embodiment of the invention in the manner shown in FIG. 2 for maintaining the data indicating the loading situation of the control point. If the control point does not already contain the OVL-SLP, it is easy to add it or another 'overload block' containing corresponding functions to the control point to achieve the function of the invention shown in FIG. 2.

The control point database according to the first preferred embodiment of the invention contains an entry E to indicate if the control point is overloaded or not. The entry E is given the value true T when the control point is overloaded and the value false when the control point is not overloaded. Alternatively, the entry E can be a flag, a semaphore or a memory address, implemented e.g. on the operating system level. The use of these techniques allows the load to be minimized since the load caused by reading the database is omitted.

In mobile communication networks according to the CAMEL architecture, the switching point SSP and the control point SCP use the CAP protocol in their mutual communication. The same control point may also communicate with another switching point and use in their mutual communication an INAP protocol, for example. In the CAP protocol stack, the uppermost layer is the CAP layer, under which the TCAP layer (Transaction Capabilities Application Part), the SCCP layer (Signalling Connection Control Point) and the MTP layer (Message Transfer Part) are located. The INAP protocol stack is otherwise identical, but it has the INAP layer as the uppermost layer, under which is the TCAP layer. In the initiation of a service, for example, the TCAP layer handler receives a TC_BEGIN primitive, whereby a new instance is created from the TCAP layer handler. This TCAP handler instance, in turn, activates the instance of an upper layer, for example the INAP handler instance or the CAP handler instance. The grounds on which the TCAP handler instance selects the instance of an upper layer to be activated, is obvious to a person skilled in the art.

Figure 2:
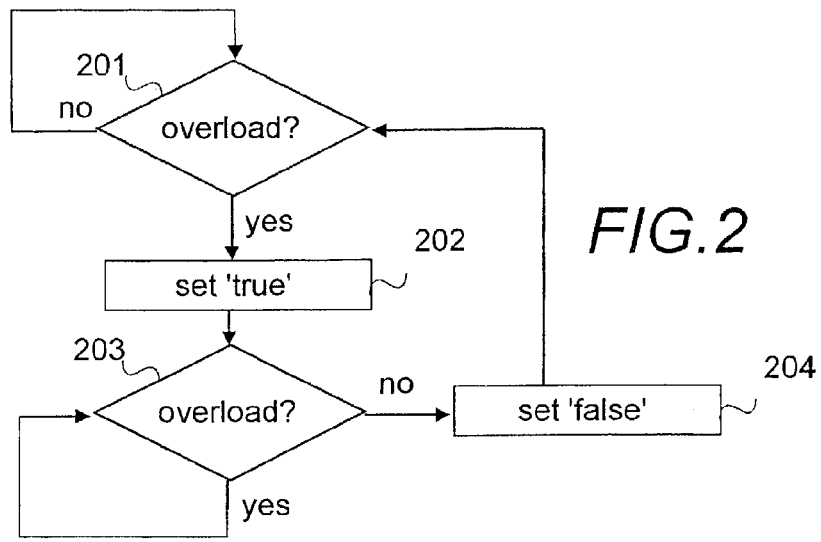
FIGS. 2 and 3 are flow diagrams of the operation of the first preferred embodiment of the invention.

FIG. 2 shows the operation of the overload instance OVL-SLP of the control point according to the invention. The OVL-SLP constantly monitors the load on the control point. Step 201 monitors if the control point is overloaded. When the monitoring is initiated in step 201, the control point is not overloaded. Step 201 continues to be monitored until it is detected that the control point is overloaded. Because of the detection of overloading, the entry in the database is given the value 'true' in step 202. Then step 203 monitors if the control point is overloaded. The monitoring is continued in step 203 until it is detected that the control point is no longer overloaded. As a result, the entry in the database is given the value 'false' in step 204 and the process continues in step 201 to monitor overloading of the control point.

The overload in the control point can be monitored in several different ways. For example, the usage of a central processing unit CPU or the situation in buffer(s) for incoming and/or outgoing messages can be monitored. Overload exists, for example, when the usage of the CPU is 100%.

Figure 3:
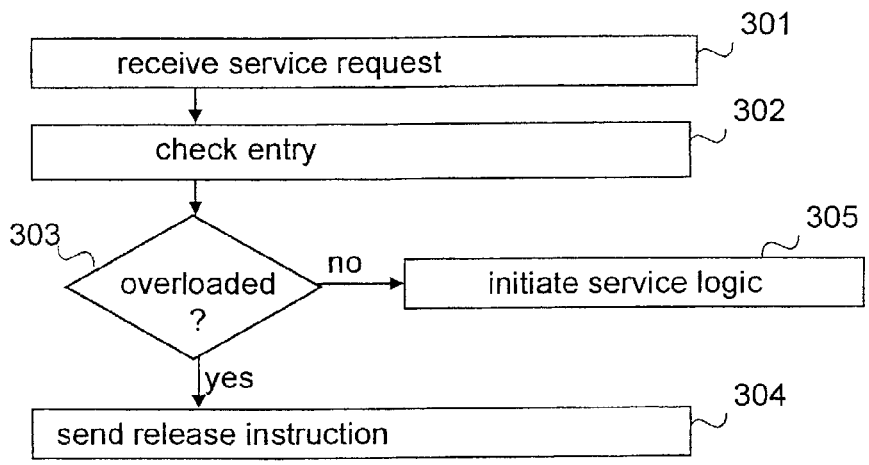

FIG. 3 shows the operation of the SCP in a first preferred embodiment of the invention, where the OVL-SLP maintains in a database an entry indicating if the control point is overloaded.

Referring to FIG. 3, in step 301, the service control point receives a service request, i.e., a service initiation request, from the service switching point. In other words, an operation is received, for example InitialDP, which triggers the initiation of the service logic. The entry indicating overloading of the control point is checked in step 302. If the control point is overloaded (step 303), i.e., the entry is true, a release connection instruction is sent in step 304. This operation, i.e., a release instruction, preferably contains information indicating that the connection is released because of overloading in the service control point. If the control point is not overloaded (step 303), the service logic is initiated in step 305, i.e., a service logic instance is created for this connection in accordance with prior art.

In the first preferred embodiment, if the SSP and the SCP use the CAP protocol in their mutual communication, the TCAP handler receives a TC_BEGIN primitive in step 301, creates a TCAP handler instance, which in turn creates a CAP handler instance. The CAP handler instance, in turn, carries out the other steps in FIG. 3. The use of the handler instances of the lower protocol layer for the functionality according to the invention saves memory since a handler instance requires less memory in the node than does the corresponding service logic. Furthermore, running a handler instance requires less CPU capacity than running corresponding service logic. The service logic can be based on considerably heavier implementation than the handler. Furthermore, the service logic can be run in an interpreting environment or in a virtual machine whereas the handler can be implemented as a precompiled machine language loading module, which uses considerably less memory and CPU capacity.

In a preferred embodiment of the invention, only the handler instances of the upper layer of the control point, which do not have at their disposal a mechanism for restricting service requests, are arranged to check overloading, i.e., the steps in FIG. 3. In this embodiment, for example phase 1 and 2 CAP handler instances carry out the steps of FIG. 3, but the INAP handler instances do not carry out steps 302 to 304 in FIG. 3. This embodiment can be implemented either by handler-specific definitions or by adding between steps 301 and 302 in FIG. 3 a step which checks if the handler instance has at its disposal a mechanism for restricting service requests. If so, the process continues directly to step 305, and if not, the process continues in step 302.

When a database entry is used for data exchange between a block monitoring overloading, such as the OVL-SLP, and an instance initiating the service logic, such as the CAP handler instance, the inability of the block and instance to communicate is not an impediment. They do not even have to be aware of each other's existence. For example the OVL-SLP knows nothing of the ongoing CAP handler instances and hence cannot communicate with them. In addition, the block monitoring overloading is not loaded with messages inquiring about the load situation, but the information is available in one place for all those requiring it.

In a preferred embodiment of the invention in which the block monitoring overloading and the instance initiating the service logic are able to communicate by the use of inter-process communication (IPC), for example, the load situation is inquired directly from the block in service triggering. In other words, in point 302, an inquiry concerning the load situation is made to the block and information on the load situation is received. In this embodiment, the block monitoring overloading does not carry out the functions shown in FIG. 2 and the control point database does not contain an entry indicating the load situation.

The sequence of the steps shown in FIGS. 2 and 3 may differ from what was described above, and the steps may be carried out in parallel. Between the steps, other steps may be carried out that are not shown in the figures, and some steps shown in the figures may also be omitted or replaced by some other function. For example in step 304, the address of another control point can be sent to the service switching point and an instruction to attempt to trigger the service from there.

For the sake of clarity, the invention is described above assuming that the control point is a physical network node comprising the control function and thus the monitored loading situation is the loading situation of the whole network node. Usually the loading situation of the whole network node is monitored also when the network node comprises the control function and the switching function. If the control function is decentralized in different nodes, the loading situation of the node is monitored in each node and on the basis of the loading situation in the node a decision is made node-specifically whether or not to trigger the service logic. If a certain portion of the capacity of the network node is allocated to the control function, the loading situation of the capacity allocated to the control function is preferably monitored.

It is to be understood that the above specification and the related figures are only intended to illustrate the present invention. Different variations and modifications of the invention are apparent to those skilled in the art, without deviating from the scope and spirit of the invention disclosed in the attached claims.

The invention claimed is:

1. A method of monitoring a load situation of a control point in an intelligent network during initiation of a service logic for controlling a connection to the intelligent network, the method comprising:
    maintaining a first data item in the control point, wherein the first data item indicates when the control point is overloaded;
    receiving an operation requesting the initiation of the service logic;
    checking a protocol layer lower than the execution layer of the service logic if the control point is overloaded;
    not initiating the service logic if the control point is determined to be overloaded; and
    initiating the service logic when the control point is determined not to be overloaded.

2. The method of claim 1, wherein the step of not initiating the service logic further comprises sending a release connection instruction.

3. The method of claim 2, further comprising appending information related to an overload situation to the release connection instruction.

4. A telecommunication system, comprising:
    at least one switching point comprising a switching function for processing a connection, the switching function being arranged to identify a need for a service and to send a service request related to the connection; and
    at least one control point for providing instructions related to the processing of the connection, the at least one control point being arranged to maintain information on whether the control point is overloaded; and in response to receiving the service request related to the connection, to check a protocol layer lower than an execution layer of a service logic of the requested service, if the control point is overloaded; and to initiate the service logic when the control point is not overloaded.

5. The telecommunication system of claim 4, wherein, in response to an overload situation, the at least one control point is arranged to send to the at least one switching point a release connection instruction including an indication that the release is due to overloading.

6. A service control point in a functional connection with a connection switching point, said service control point comprising:
    instruction means for providing instructions related to the processing of the functional connection to the connection switching point;
    maintaining means for maintaining information on whether the service control point is overloaded;

checking means for checking, in response to the reception of a service request related to the connection switching point, a protocol layer lower than an execution layer of a service logic of the requested service if the service control point is overloaded; and initiating means for initiating the service logic if the service control point is not overloaded.

7. The service control point of claim 6, further comprising:

a storage means comprising an entry field for indicating if the service control point is overloaded; and a monitoring means for monitoring the overload situation and updating the entry field at least when the service control point becomes overloaded and when the overload is cleared.

8. The service control point of claim 6, further comprising:

on the operating system level, an entry field for indicating if the service control point is overloaded; and a monitoring means for monitoring the overload situation and updating the entry field at least when the service control point becomes overloaded and when the overload is cleared.

9. The service control point of claim 6, further comprising:

a monitoring means for monitoring the overload situation and providing information on whether the service control point is overloaded; and sending means for sending, in response to the reception of the service request, an inquiry to the block monitoring means related to the overload situation if the service control point is overloaded.

10. The service control point of claim 6, further comprising:

a sending means for sending a release connection instruction in response to an overload situation.

11. The service control point of claim 10, further comprising:

an addition means for adding to the release connection instruction an indication that the release connection is due to an overload situation in the service control point.

12. A telecommunication system, comprising:

switching means for processing a connection, the switching means being arranged to identify a need for a service and to send a service request related to the connection; and controlling means for giving instructions related to the processing of the connection, the controlling means being arranged to maintain information on whether a control point is overloaded; and in response to receiving the service request related to the connection, to check a protocol layer lower than an execution layer of a service logic of the requested service, if the control point is overloaded; and to initiate the service logic when the control point is not overloaded.

13. The telecommunication system of claim 12, wherein, in response to an overload situation, the control point is arranged to send to the switching means a release connection instruction including an indication that the release is due to overloading.

\* \* \* \* \*